Feb. 8, 1927.  
M. M. YORE  
WHEEL CLEAT  
Filed June 12, 1926  
1,617,282  
2 Sheets-Sheet 1
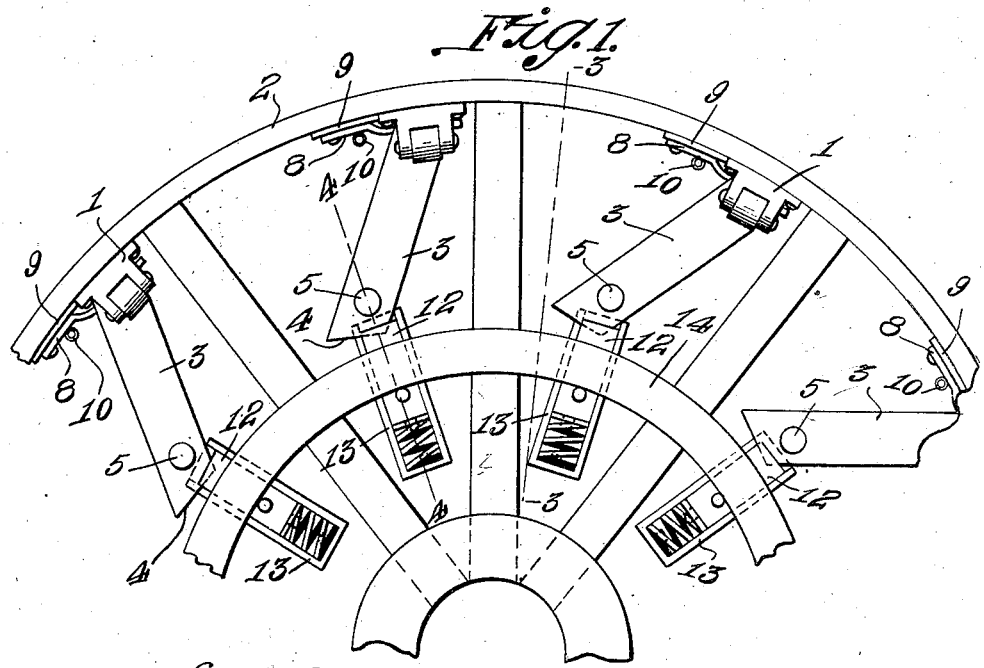
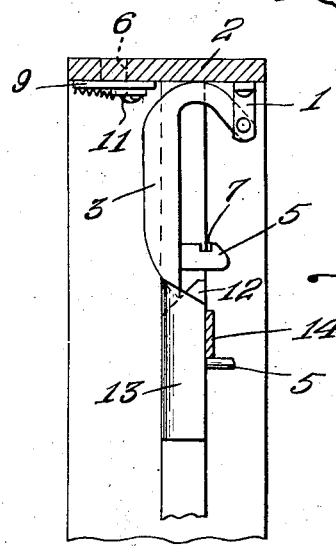
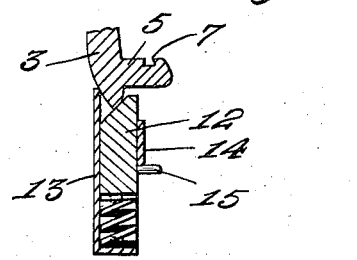
Martin M. Yore, INVENTOR
BY Victor J. Evans ATTORNEY
WITNESS.

Feb. 8, 1927. 1,617,282
M. M. YORE
WHEEL CLEAT
Filed June 12, 1926 2 Sheets-Sheet 2
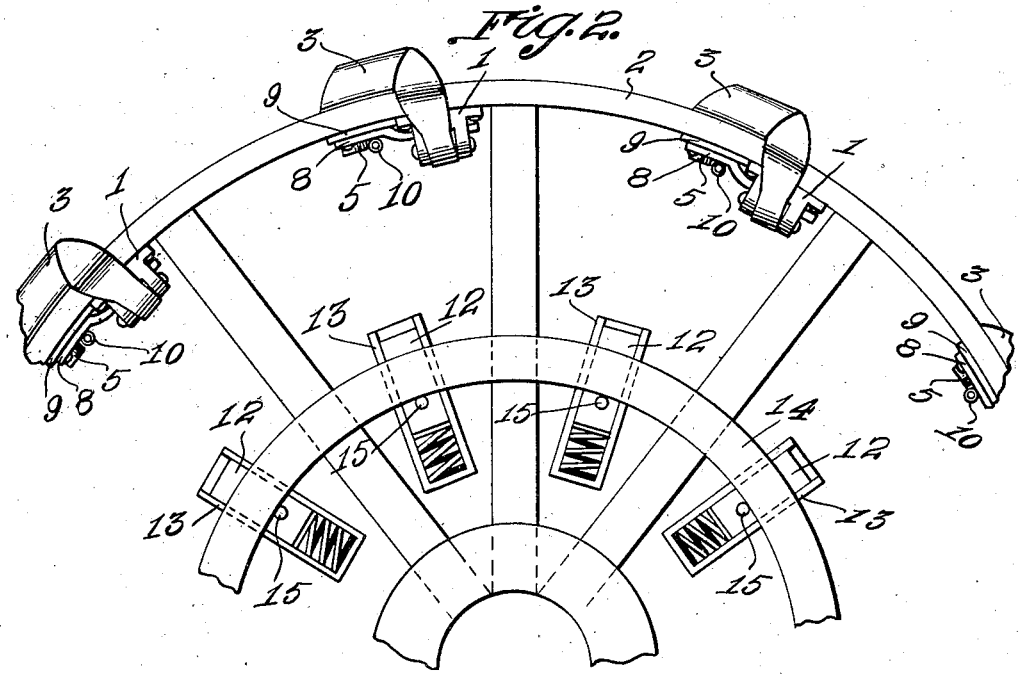
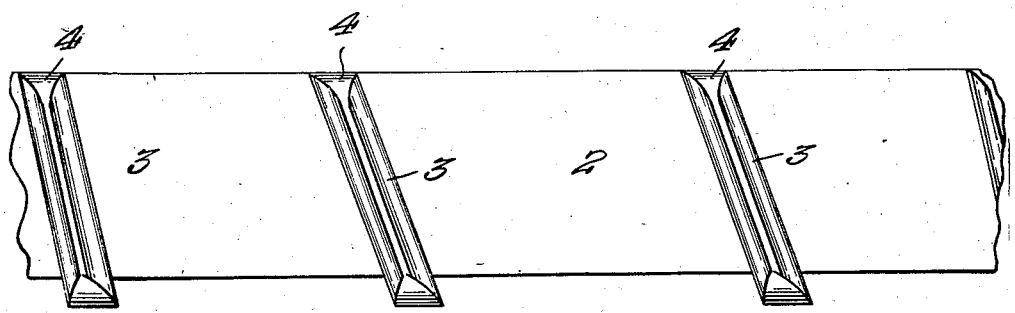
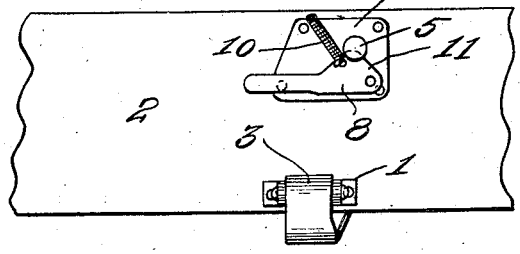

Patented Feb. 8, 1927.

1,617,282

UNITED STATES PATENT OFFICE.

MARTIN M. YORE, OF WEST MANSFIELD, OHIO.

WHEEL CLEAT.

Application filed June 12, 1926. Serial No. 115,580.

This invention relates to cleats or mud lugs for wheels, the general object of the invention being to provide means whereby the lugs or cleats can be placed transversely on the rim of the wheel or swung to a position at one side of the wheel when a plain rim is sufficient to secure traction, as on paved streets or the like, and where the lugs or cleats would damage the streets if used.

Another object of the invention is to provide spring latch means for holding the lugs or cleats in operative position and to provide spring pressed plungers for holding them in inoperative position.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of part of a wheel to which my invention is applied, the lugs being shown in inoperative position.

Figure 2 is a similar view but showing the lugs in operative position.

Figure 3 is a section on line 3—3 of Figure 1.

Figure 4 is a section on line 4—4 of Figure 1.

Figure 5 is a view of part of the rim of a wheel, showing the lugs thereon.

Figure 6 is a fragmentary view of the inner face of the rim, showing a lug held in operative position by its latch member.

As shown in these views, I secure a number of brackets 1 on the inner face of the rim 2 of the wheel, and to each bracket, I hinge or pivot a lug or cleat 3. Each cleat is of substantially hook shape, with the extremity of its hook part pivoted to the bracket, and said lug or cleat is so formed that it will extend at a slight incline transversely across the outer face of the rim when the lug is in operative position. The ends of each lug are beveled, as shown at 4, and they are preferably of wedge shape in cross section. An inwardly extending part 5 is formed on the free end of each lug or cleat and these projections are adapted to extend through holes 6 formed in the rim, each projection having a notch 7 therein which is adapted to be engaged by a latch lever 8 pivoted to the inner face of the rim or to a plate 9 carried thereby, a spring 10 holding the lever with its enlarged part 11 engaging the notch 7 in the projection. Thus the lugs or cleats will be held on the outer face of the rim, and said lugs will give traction to the wheel in muddy or soft ground as well as in snow and ice. When a smooth tread is sufficient, as on paved streets and the like, the latch levers 8 are moved to releasing position and the lugs or cleats swung to one side of the wheel, where they are held in inoperative position by the spring pressed plunger 12 carried by the cylinders 13 which are supported on a ring 14 fastened to the spokes of the wheels. The outer ends of the plungers 12 are beveled to engage the beveled ends 4 of the lugs and thus hold the lugs in the position they occupy in Figures 1, 3 and 4. A pin 15 is carried by each plunger 12 and acts as a handle and also as a stop for limiting the movement of the plunger given it by the spring.

From the foregoing, it will be seen that I have provided simple means for holding the lugs or cleats in either operative or inoperative position so that the cleats can be used or not according to the condition of the surface of the road over which the vehicle is traveling, the cleats remaining on the wheel at all times so that there is no danger of losing them.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a wheel, brackets secured to the inner face of the rim thereof, a cleat having a hook-shaped end pivoted to each bracket so that the cleat can extend transversely across the rim, a ring on the wheel, cylinders carried thereby, spring plungers in the cylinders engaging the free ends of the cleats to hold them in inoperative position and a handle on each plunger.

2. In combination with a wheel, a plurality of brackets fastened to the inner face thereof, a plurality of cleats each having a hook-shaped end pivoted to a bracket, the rim having holes therein, projections on the free ends of the cleats for engaging the holes when the cleats are moved to a position on the outer face of the rim, and spring actuated latch levers engaging parts of the projections for holding the cleats on the outer face of the rim.

In testimony whereof I affix my signature.

MARTIN M. YORE.